United States Patent
Freedman et al.

(10) Patent No.: US 11,861,997 B2
(45) Date of Patent: Jan. 2, 2024

(54) THEFT DETECTION SYSTEM

(71) Applicant: Toshiba Global Commerce Solutions Holdings Corporation, Tokyo (JP)

(72) Inventors: Sharon Freedman, Cary, NC (US); Scott Graham, Oxford, NC (US); Suzanne M. Bleakley, Durham, NC (US); Tuyen Bui, Durham, NC (US)

(73) Assignee: Toshiba Global Commerce Solutions Holdings Corporation, Tokyo (JP)

( * ) Notice: Subject to any disclaimer, the term of this patent is extended or adjusted under 35 U.S.C. 154(b) by 285 days.

(21) Appl. No.: 17/074,128

(22) Filed: Oct. 19, 2020

(65) Prior Publication Data

US 2022/0122434 A1    Apr. 21, 2022

(51) Int. Cl.
| | |
|---|---|
| *G01G 19/52* | (2006.01) |
| *G01G 19/62* | (2006.01) |
| *G01G 23/32* | (2006.01) |
| *G01G 19/08* | (2006.01) |
| *G07G 3/00* | (2006.01) |
| *G08B 13/14* | (2006.01) |
| *G06Q 30/018* | (2023.01) |
| *G06Q 20/20* | (2012.01) |
| *G06K 19/07* | (2006.01) |
| *G06K 7/10* | (2006.01) |

(52) U.S. Cl.
CPC ......... *G08B 13/1472* (2013.01); *G01G 19/52* (2013.01); *G01G 19/62* (2013.01); *G01G 23/32* (2013.01); *G06Q 20/208* (2013.01); *G06Q 30/0185* (2013.01); *G06K 7/10297* (2013.01); *G06K 19/0723* (2013.01); *G06K 2007/10504* (2013.01)

(58) Field of Classification Search
CPC .................................................. G08B 13/1472
See application file for complete search history.

(56) References Cited

U.S. PATENT DOCUMENTS

| | | | |
|---|---|---|---|
| 8,191,780 B2* | 6/2012 | Daily | G06Q 20/208 |
| | | | 235/383 |
| 2003/0122667 A1* | 7/2003 | Flynn | G08B 13/19689 |
| | | | 340/572.1 |
| 2007/0007078 A1* | 1/2007 | Johnson | G07G 1/0054 |
| | | | 186/61 |
| 2007/0045011 A1* | 3/2007 | Dittrich | G01G 19/58 |
| | | | 177/148 |
| 2008/0005036 A1* | 1/2008 | Morris | G01G 23/3735 |
| | | | 705/64 |
| 2008/0121702 A1* | 5/2008 | Fortenberry | G07G 1/0054 |
| | | | 235/383 |

(Continued)

*Primary Examiner* — Joseph H Feild
*Assistant Examiner* — Pameshanand Mahase
(74) *Attorney, Agent, or Firm* — Patterson + Sheridan, LLP

(57) ABSTRACT

A method includes supporting, by a support, a bag containing one or more items of an order and detecting, by a sensor coupled to an end of the support, a weight of the bag and the one or more items when the bag is suspended on the support such that the weight of the bag and the one or more items is exerted on the support. The method also includes comparing, by a hardware processor, the detected weight to an expected weight of the order and communicating, by the hardware processor, an alert when the expected weight is unequal to the detected weight.

20 Claims, 6 Drawing Sheets

(56) References Cited

U.S. PATENT DOCUMENTS

| | | | | |
|---|---|---|---|---|
| 2008/0251298 A1* | 10/2008 | Kritzler | ............ | G01G 19/58 177/126 |
| 2014/0214577 A1* | 7/2014 | Acker, Jr. | ............ | G01G 19/12 705/23 |

* cited by examiner

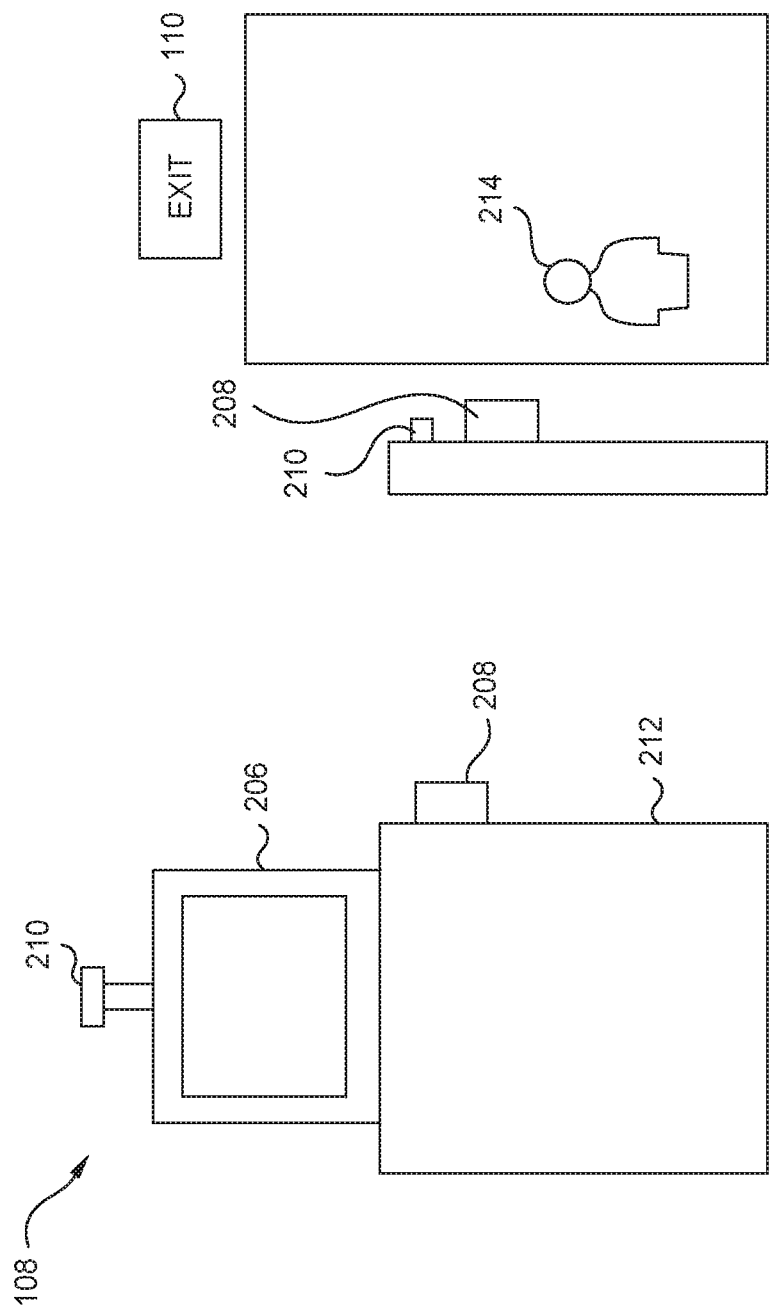

US 11,861,997 B2

THEFT DETECTION SYSTEM

BACKGROUND

The present invention relates to a theft detection system, and more specifically, to a system that detects theft as the theft is occurring in certain embodiments.

Stores are increasingly implementing self-checkout solutions in which customers scan and pay for items without interacting with a store employee. These solutions include installing checkout stations, where the customers scan, bag, and pay for their items, and scan and go applications on mobile devices, in which customers scan items while shopping and pay for the items before exiting the store. These solutions, however, rely on the honesty of the customer and, thus, increase the risk of theft. For example, customers can take items without scanning or paying for them and without a store employee noticing.

Customers are also increasingly bringing and using their own bags (e.g., eco-bags) to hold items while shopping. This practice further increases the risk of theft, because customers can hide items in the bag underneath purchased items.

SUMMARY

According to an embodiment, a method includes supporting, by a support, a bag containing one or more items of an order and detecting, by a sensor coupled to an end of the support, a weight of the bag and the one or more items when the bag is suspended on the support such that the weight of the bag and the one or more items is exerted on the support. The method also includes comparing, by a hardware processor, the detected weight to an expected weight of the order and communicating, by the hardware processor, an alert when the expected weight is unequal to the detected weight.

According to another embodiment, a system includes a support, a sensor, and a computer system. The support supports a bag containing one or more items of an order. The sensor is coupled to an end of the support and detects a weight of the bag and the one or more items when the bag is suspended on the support such that the weight of the bag and the one or more items is exerted on the support. The computer system is communicatively coupled to the sensor and includes a memory and a hardware processor. The hardware processor compares the detected weight to an expected weight of the order and communicates an alert when the expected weight is unequal to the detected weight.

According to another embodiment, a system includes a support, a sensor, a scanner, and a computer system. The support supports a bag containing one or more items of an order. The sensor is coupled to an end of the support and detects a weight of the bag and the one or more items when the bag is suspended on the support such that the weight of the bag and the one or more items is exerted on the support. The scanner scans an identifier on the bag. The computer system is communicatively coupled to the sensor and includes a memory and a hardware processor. The hardware processor determines a weight of the bag based on the scanned identifier and removes the weight of the bag from the detected weight. The hardware processor compares the detected weight to an expected weight of the order and communicates an alert when the expected weight is unequal to the detected weight.

BRIEF DESCRIPTION OF THE DRAWINGS

FIGS. 2A through 2C illustrate an example checkout station of the system of FIG. 1;
FIG. 2D illustrates an example exit station of the system of FIG. 1.

DETAILED DESCRIPTION

This disclosure contemplates a theft detection system. Generally, the system implements a support (e.g., a bar, a hook, etc.) on which customers can hang bags of items. These supports may be installed at checkout stations and/or exit stations. A sensor coupled to the support detects a weight of the bag and the items within the bag. A computer system compares the detected weight with an expected weight of scanned items. When these weights are unequal, the computer system communicates an alert, which may prompt a store employee to inspect the bag or to scrutinize the customer's purchase. In this manner, the system detects theft as the theft is occurring in certain embodiments.

Figure 1:
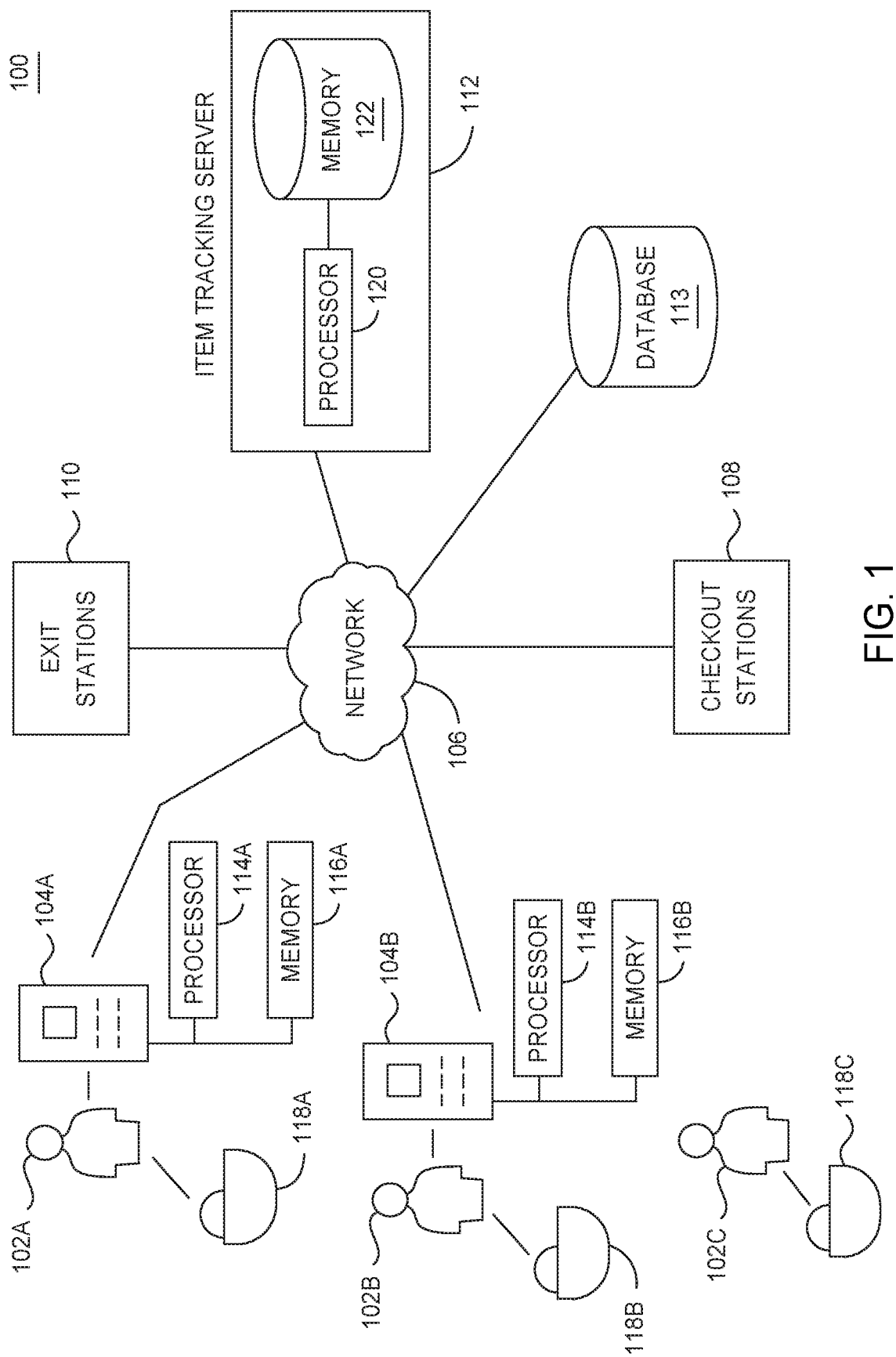
FIG. 1 illustrates an example system.

FIG. 1 illustrates an example system 100. As seen in FIG. 1, the system 100 includes one or more devices 104, a network 106, one or more checkout stations 108, one or more exit stations 110, an item tracking server 112, and a database 113. The system 100 may be implemented in a store and provides a user 102 with a variety of ways to checkout and pay for items. Generally, the system 100 tracks the items purchased by one or more users 102 and may detect when a user 102 takes an item without purchasing it.

A user 102 uses a device 104 to interact with other components of the system 100. For example, a user 102 may use a device 104 to scan items that the user 102 wishes to purchase. The user 102 may also use the device 104 to pay for items that the user 102 desires to purchase. The device 104 may execute an application that scans identification codes on items that the user 102 desires to purchase (e.g., bar codes or QR codes). The application may also provide the user 102 an option to pay for scanned items.

The system 100 may include any suitable number of devices 104. In the example of FIG. 1, the system 100 includes a device 104A used by a user 102A and a device 104B used by a user 102B. The device 104A includes a processor 114A and a memory 116A, which are configured to perform any of the functions of a device 104 described herein. Additionally, a device 104B includes a processor 114B and a memory 116B, which are configured to perform any of the functions of a device 104 described herein.

The processor 114 is any electronic circuitry, including, but not limited to microprocessors, application specific integrated circuits (ASIC), application specific instruction set processor (ASIP), and/or state machines, that communicatively couples to memory 116 and controls the operation of the device 104. The processor 114 may be 8-bit, 16-bit, 32-bit, 64-bit or of any other suitable architecture. The processor 114 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The processor 114 may include other hardware that operates software to control and process information. The processor 114 executes software stored on memory to perform any of the functions described herein. The processor 114 controls the operation and administration of the device 104 by processing information (e.g., information received from the devices 104, network 106, item tracking server 112, and memory 116). The processor 114 may be a programmable logic device, a microcontroller, a microprocessor, any suitable processing device, or any suitable combination of the preceding. The processor 114 is not limited to a single processing device and may encompass multiple processing devices.

The memory 116 may store, either permanently or temporarily, data, operational software, or other information for the processor 114. The memory 116 may include any one or a combination of volatile or non-volatile local or remote devices suitable for storing information. For example, the memory 116 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in the memory 116, a disk, a CD, or a flash drive. In particular embodiments, the software may include an application executable by the processor 114 to perform one or more of the functions described herein.

Devices 104 include any appropriate device for communicating with components of system 100 over network 106. As an example and not by way of limitation, device 104 may be a computer, a laptop, a wireless or cellular telephone, an electronic notebook, a personal digital assistant, a tablet, or any other device capable of receiving, processing, storing, and/or communicating information with other components of system 100. Device 104 may also include a user interface, such as a display, a microphone, keypad, or other appropriate terminal equipment usable by user 102. Device 104 may include a hardware processor, memory, and/or circuitry configured to perform any of the functions or actions of device 104 described herein. For example, a software application designed using software code may be stored in the memory and executed by the processor to perform the functions of device 104.

The system 100 includes one or more bags 118 that users 102 use to hold items that the users 102 desire to purchase. The users 102 may bring their own bags 118, or a store implementing the system 100 may provide the bags 118. The bags 118 may be reusable bags that cut down on the use of disposable bags, which reduces waste. In the example of FIG. 1, the user 102A uses a bag 118A, the user 102B uses a bag 118B, and the user 102C uses the bag 118C. Although bags 118 may be good from an environmental standpoint, the bags 118 introduce a risk of theft. For example, a user 102 may attempt to hide items in the bag 118 underneath purchased items. The system 100 can detect when a bag 118 contains an item that a user 102 did not purchase.

The network 106 allows communication between and amongst the various components of the system 100. This disclosure contemplates the network 106 being any suitable network operable to facilitate communication between the components of the system 100. The network 106 may include any interconnecting system capable of transmitting audio, video, signals, data, messages, or any combination of the preceding. The network 106 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

As discussed previously, the system 100 provides the users 102 a variety of ways to scan and pay for their items. For example, the users 102 may use their devices 104 to scan and pay for their items. Additionally, a user 102 may use a checkout station 108 to scan and/or pay for their items. For example, the user 102 may bring items to a checkout station 108 to scan the items and to pay for the items. As another example, a user 102 may use a device 104 to scan items and then bring the items to a checkout station 108 to pay for the items.

Security checks may be performed at one or more exit stations 110. A user 102 may bring purchased items to an exit station 110 to exit a store implementing the system 100. A store employee located at the exit station 110 may review a receipt provided by the user 102 and inspect the items purchased by the user 102 to determine whether the user 102 paid for all the items. If the user 102 is hiding an item underneath purchased items in a bag 118, then the store employee may encounter difficulty detecting the hidden item. As a result, the user 102 may leave the store without paying for all the items.

The item tracking server 112 tracks the items purchased by the users 102. As seen in the example of FIG. 1, the item tracking server 112 includes a processor 120 and a memory 122, which are configured to perform any of the functions of the item tracking server 112 described herein.

The processor 120 is any electronic circuitry, including, but not limited to microprocessors, application specific integrated circuits (ASIC), application specific instruction set processor (ASIP), and/or state machines, that communicatively couples to memory 122 and controls the operation of the item tracking server 112. The processor 120 may be 8-bit, 16-bit, 32-bit, 64-bit or of any other suitable architecture. The processor 120 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The processor 120 may include other hardware that operates software to control and process information. The processor 120 executes software stored on memory to perform any of the functions described herein. The processor 120 controls the operation and administration of the item tracking server 112 by processing information (e.g., information received from the devices 104, network 106, database 113, and memory 122). The processor 120 may be a programmable logic device, a microcontroller, a microprocessor, any suitable processing device, or any suitable combination of the preceding. The processor 120 is not limited to a single processing device and may encompass multiple processing devices.

The memory 122 may store, either permanently or temporarily, data, operational software, or other information for the processor 120. The memory 122 may include any one or a combination of volatile or non-volatile local or remote devices suitable for storing information. For example, the memory 122 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in the memory 122, a disk, a CD, or a flash drive. In particular embodiments, the software may include an application executable by the processor 120 to perform one or more of the functions described herein.

The database 113 stores information about the items purchased by a user 102. For example, the database 113 may store the weights and/or prices of particular items in the store. The database 113 may communicate information about purchased items to the item tracking server 112 upon request.

Figure 2B:
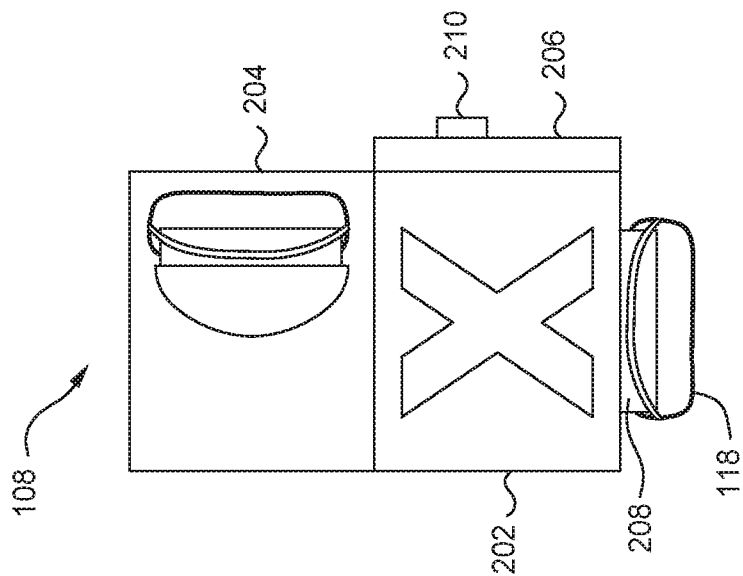
Figure 2A:
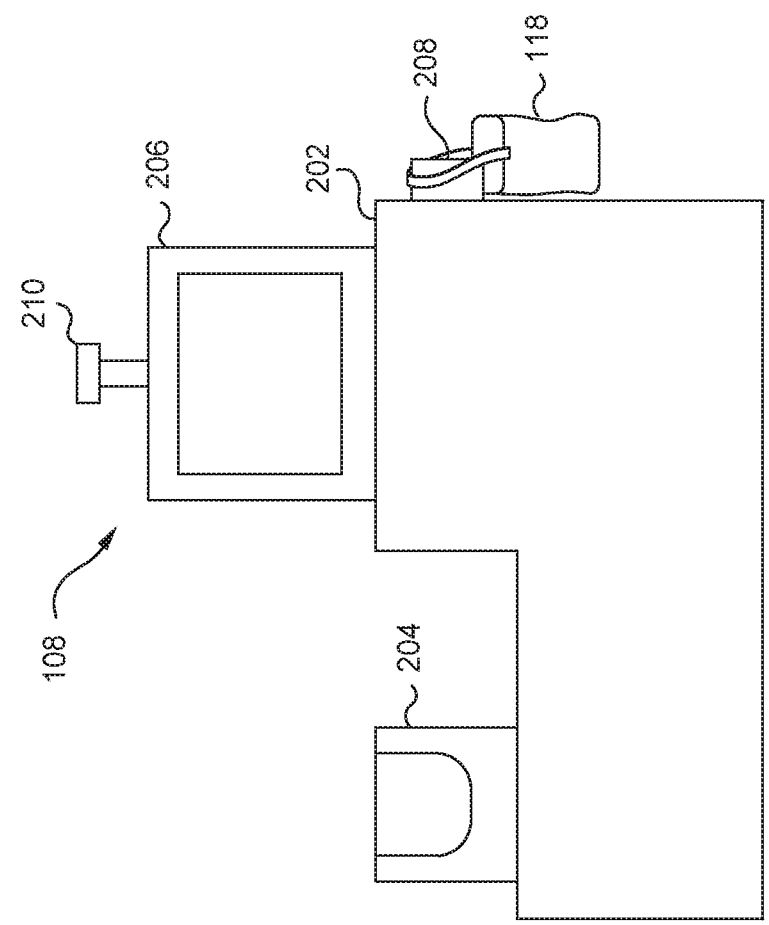

FIGS. 2A and 2B illustrate an example checkout station 108. FIG. 2A illustrates a front view of the checkout station 108, and FIG. 2B illustrates a top view of the checkout station 108. As seen in FIGS. 2A and 2B, the checkout station 108 includes a scanner 202, a bagging station 204, a display 206, a support 208, and a light 210. Generally, a user 102 scans and pays for items at the checkout station 108. In particular embodiments, the support 208 allows the system 100 to detect when the user 102 has not paid for all items.

The scanner 202 may be any suitable scanner that scans a tag or code on an item to identify that item. For example, the scanner 202 may be a bar code scanner or an RFID scanner. The scanner 202 may scan a bar code or an RFID tag on the item. Scanning the bar code or the RFID tag may produce a unique identifier that identifies the item. The checkout station 108 may use the identifier to identify the item and to determine a price for the item.

The bagging station 204 includes an area for users 102 to sort and/or store scanned items. For example, the bagging station 204 may include one or more bags, in which the users 102 may place scanned items. Users 102 who have brought their own bags 118 may opt to place scanned items into one or more bags 118 rather than the disposable bags provided at the bagging station 204.

The display 206 provides information about purchased items to the user 102. For example, the display 206 may identify the items scanned by the scanner 202 and provide the prices for these items. The display 206 may also provide a running total of the scanned items. Additionally, the display 206 may provide instructions to the user 102 while using the checkout station 108.

The user 102 may hang a bag 118 of items on the support 208. For example, a user 102 may remove a bag 118 from the user's 102 shoulder and hang the bag 118 on the support 208 to free up the user's 102 arms during checkout. The support 208 may be coupled to a weight sensor that detects the weight of the bag 118 and the items in the bag 118 as the bag 118 hangs on the support 208. The support 208 may be positioned near the scanner 202, so that a user 102 may reach into the bag 118 to take out an item and scan the item on the scanner 202 with ease.

As the user 102 scans items from the bag 118, the checkout station 108 may report the scanned item to the item tracking server 112. The item tracking server 112 may track the weight of the scanned items. For example, the item tracking server 112 may retrieve the weights of scanned items from the database 113. When the user 102 indicates that all items have been scanned, the item tracking server 112 may compare the total weight of the scanned items with the weight detected by the weight sensor coupled to the support 208 (e.g., an initial weight before the user 102 scanned any items). If these weights are unequal, the item tracking server 112 may communicate an alert indicating that the user 102 has not scanned all items. This disclosure contemplates that the item tracking server 112 communicates the alert when the total weight of the scanned items and the weight detected by the support 208 and the weight sensor are unequal past a threshold (e.g., a quarter of a pound).

The light 210 may activate when the alert is communicated indicating that the user 102 has not scanned all items. A store employee may see the activated light 210 and approach the checkout station 108 to assist the user 102. The store employee may also approach the checkout station 108 to investigate whether the user 102 is attempting to take an item without purchasing that item. In this manner, the checkout station 108 detects theft as the theft is occurring in certain embodiments.

FIG. 2C illustrates an example checkout station 108. As seen in FIG. 2C, the checkout station 108 includes a display 206, a support 208, a light 210, and a base 212. Generally, the checkout station 108 of FIG. 2C resembles a kiosk. A user 102 who has scanned items using a device 104 may use the checkout station 108 of FIG. 2C to pay for the items. For example, the user 102 may have used a device 104 to scan the items when the user 102 took the item and placed it into a bag 118. The item tracking server 112 may track the items as the user 102 scans the items using the device 104. The user 102 may use the kiosk to pay for the items in the bag 118 before leaving the store.

The user 102 may bring a bag 118 of scanned items to the checkout station 108. The user 102 may then hang the bag 118 on the support 208 to free up the user's 102 arms while paying for the items. As with previous examples, the support 208 is coupled to a weight sensor that detects a weight of the bag 118 and the items in the bag 118. The checkout station 108 reports the detected weight to the item tracking server 112. As described previously, the item tracking server 112 then compares the detected weight with the total weight of the scanned items. For example, the item tracking server 112 may retrieve a weight of an item from the database 113 when the user 102 scans the item using the device 104. The item tracking server 112 may keep a running total of the weight of scanned items. The item tracking server 112 may then compare that total weight to the weight detected by the weight sensor and the support 208. When the total weight of scanned items and the detected weight are unequal, for example, unequal beyond the threshold, the item tracking server 112 communicates an alert. The light 210 on the checkout station 108 activates in response to the alert. When a store employee sees the activated light 210, the store employee may approach the checkout station 108 to assist the user 102 and/or to investigate whether the user 102 is attempting to take an item without purchasing the item. In this manner, the checkout station 108 detects theft as the theft is occurring in certain embodiments.

FIG. 2D illustrates an example exit station 110 of the system 100 of FIG. 1. As seen in FIG. 2D, a support 208 and a light 210 may be positioned near the exit station 110. Additionally, a store employee 214 may be positioned near the exit station 110. Generally, the support 208 positioned near the exit station 110 may detect theft by users 102 who use their devices 104 to scan and pay for items. The item tracking server 112 may track the total weight of the items scanned and paid for by the user 102. When the users 102 bring a bag 118 of items to the exit station 110, the store employee 214 may ask the users 102 to hang the bag of items 118 on the support 208. The support 208 may be coupled to a weight sensor that detects the weight of the bag 118 of items. The detected weight may then be communicated to the item tracking server 112.

The item tracking server 112 compares the detected weight with the total weight of scanned and/or purchased items. For example, the item tracking server 112 may retrieve the weight of scanned items from the database 113 when a user 102 scans the items using the device 104. Alternatively or additionally, the item tracking server 112 may track the weight of purchased items when the user 102 pays for the items using the device 104. When the detected weight is unequal, for example unequal past a threshold, from the total weight of scanned or purchased items, the item tracking server 112 communicates an alert. In response to the alert, the light 210 may activate. When the store employee 214 sees the activated light 210, the store employee 214 may investigate whether the user 102 has paid for the items in the bag 118. For example, the store employee 214 may look through the bag 118 and compare the items in the bag 118 against a receipt on the user's device 104. In this manner, the exit station 110 provides a layer of security that detects theft as it is occurring in certain embodiments.

If a user 102 used a checkout station 108 rather than a device 104 to pay for items, the user 102 may present a receipt to the store employee 214. The store employee 214 may review the receipt and look through the bag 118 of the user 102 to determine whether the user 102 has paid for the items in the bag 118.

Figure 3A:
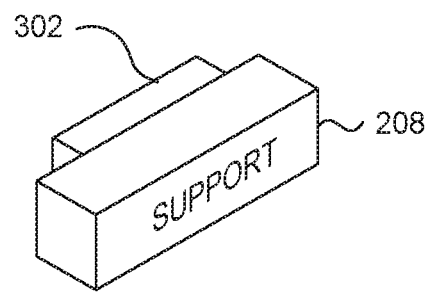
FIGS. 3A through 3C illustrate example supports and sensors of the system of FIG. 1.
Figure 3B:
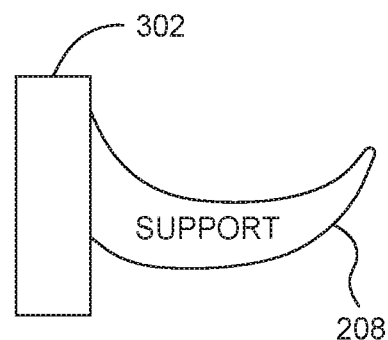
Figure 3C:
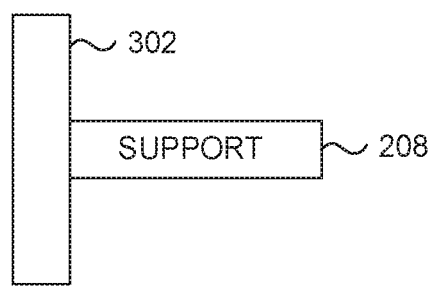

FIGS. 3A through 3C illustrate example supports 208 of the system 100 of FIG. 1. Generally, the supports 208 are coupled at an end to a sensor 302. In particular embodiments, a user 102 may hang a bag 118 from the support 208. The sensor 302 may detect a weight of the bag 118, and the items in the bag 118 as the support 208 supports the weight of the bag 118 and the items in the bag 118.

In the example of FIG. 3A, the support 208 is a bar or platform. The sensor 302 is coupled to a back end of the support 208. The sensor 302 may be a tension sensor that detects a tension created by the weight of a bag 118 hanging on the support 208. The tension may be directed from the sensor 302 towards the support 208. The sensor 302 may convert the detected tension to a weight. The heavier the bag 118 and the items in the bag 118 are, the more tension is detected by the sensor 302. The sensor 302 may communicate the detected weight to the item tracking server 112.

In the example of FIG. 3B, the support 208 is a hook and the sensor 302 is coupled to an end of the hook. The other end of the hook may be pointed, and may support the weight of a bag 118 and the items in the bag 118. The user 102 may hang the bag 118 on the support 208. As described previously, the weight of the bag 118 and items in the bag 118 may cause a tension force from the sensor 302 to the support 208. The sensor 302 may detect the tension and may convert that tension to a detected weight. The sensor 302 may then communicate the detected weight to the item tracking server 112.

In FIG. 3C, the support 208 is a bar or platform. The sensor 302 is coupled to a back side of the support 208. A user 102 may hang a bag 118 on support 208 or the user 102 may place the bag on top of the support 208. The weight of the bag 118 and the items in the bag 118 may create a tension force from the sensor 302 to the support 208. The sensor 302 detects the tension and converts the tension to a detected weight. The sensor 302 then reports the detected weight to the item tracking server 112.

Figure 4:
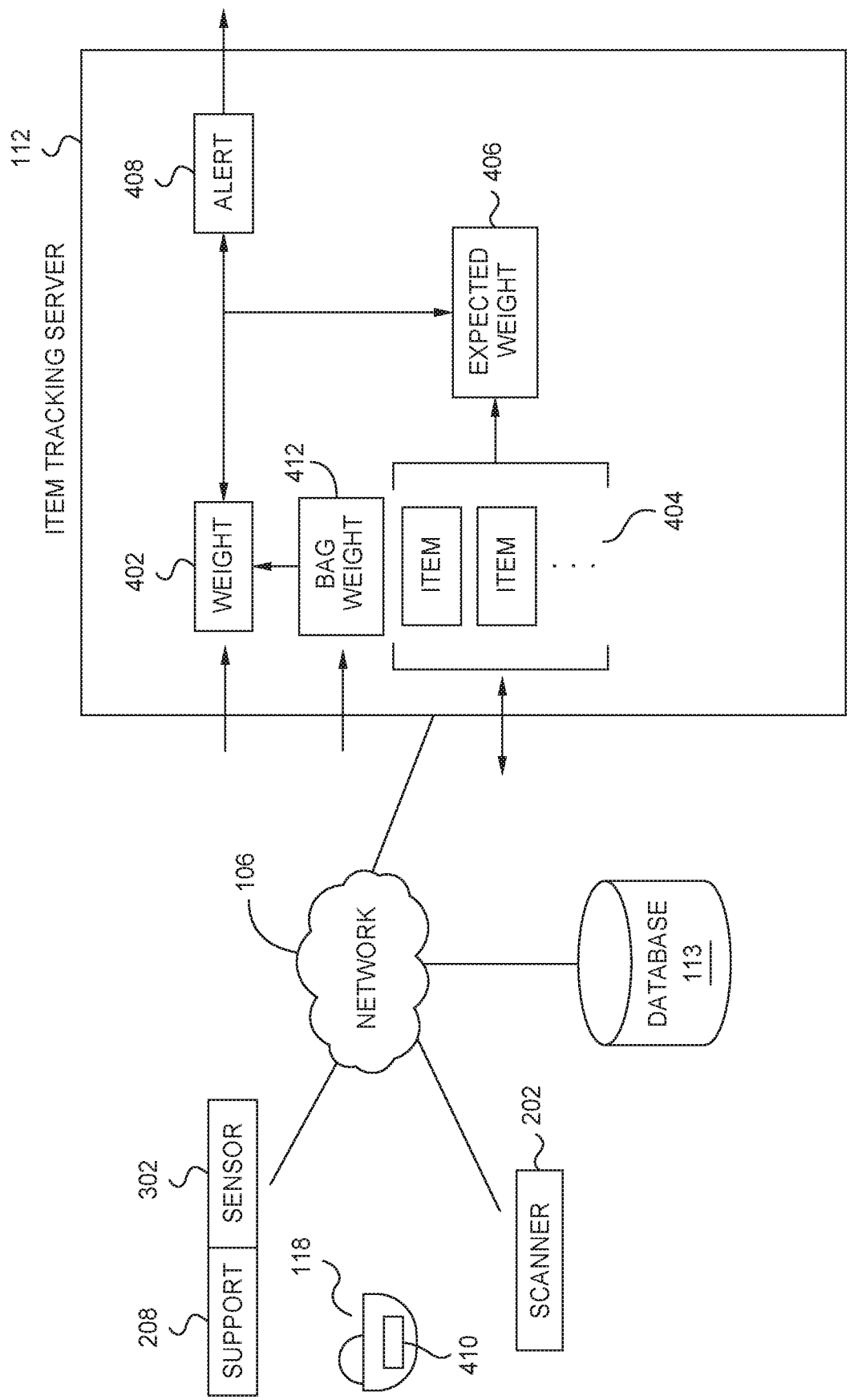
FIG. 4 illustrates a portion of the system of FIG. 1.

FIG. 4 illustrates a portion of the system 100 of FIG. 1. Even though the example of FIG. 4 does not include every component of the system 100, the absence of these components does not indicate their removal from the system 100.

As seen in FIG. 4, the system 100 includes a support 208 coupled to a sensor 302. A sensor 302 may be a tension sensor coupled to an end of the support 208. A user 102 may hang a bag 118 of items onto support 208. The sensor 302 may then detect a weight of the bag 118 and the items in the bag 118. The support 208 and the sensor 302 may be located at a checkout station 108 and/or an exit station 110.

If the support 208 is located at a checkout station 108, the user 102 may use a scanner 202 at the checkout station 108 to scan the items in the bag 118. If the support 208 being used is located at an exit station 110, then the user 102 has presumably already scanned and/or paid for the items in the bag 118.

The sensor 302 detects a weight of the bag 118 and the items in the bag 118. The sensor 302 then reports the detected weight 402 to the item tracking server 112. The item tracking server 112 then determines an expected weight 406 of the items in the bag 118. For example, if the user 102 is scanning items at a checkout station 108 then the item tracking server 112 may receive an identification of the items 404 as the user scans the items 404 at the checkout station 108. The item tracking server 112 communicates the identification of these items 404 to the database 113. In response, the database 113 returns the weight of the items 404 to the item tracking server 112. The item tracking server 112 then totals these weights to determine the expected weight 406. As another example, if the user 102 uses a device 104 to scan items, then the item tracking server 112 receives the identification of the items 404 from the devices 104. The item tracking server 112 then communicates the identification of these items 404 to the database 113. In response, the database 113 returns the weights of the items 404. The item tracking server 112 sums these weights to determine the expected weight 406. In certain embodiments the item tracking server 112 may keep a running total for the expected weight 406. For example, the item tracking server 112 may add the weight of an item 404 to the expected weight 406 when that item 404 is scanned.

The item tracking server 112 compares the weight 402 with the expected weight 406 to determine if the user 102 has scanned or paid for all items in the bag 118. When the weight 402 is unequal (e.g., unequal past a threshold) from the expected weight 406, the item tracking server 112 determines that the user 102 has not paid for all the items in the bag 118. For example, if the weight 402 exceeds the expected weight 406 past a threshold, then this may indicate that the bag 118 contains an item that is unaccounted for. In response, the item tracking server 112 generates and communicates an alert 408. In particular embodiments, a light 210 may activate in response to the alert 408.

In particular embodiments, the bag 118 includes an identifier 410. The identifier 410 may be a code such as a bar code or a QR code. The identifier 410 may be scanned by a scanner 202 and/or by a device 104 to identify the bag 118. The database 113 may contain the weight of the bag 118. These weights may represent the weight of the bag 118 when nothing is in the bag 118. A user 102 and/or a store implementing the system 100 may have registered the bag 118 along with its empty weight. The registration process allows the database 113 to link bags 118 with their empty weights. When a user 102 scans the identifier 410 using a device 104 or a scanner 202, the item tracking server 112 may determine the identity of the bag 118 and retrieve the bag weight 412 from the database 113. The bag weight 412 may be the empty weight of the bag 118. The item tracking server 112 may deduct the bag weight 412 from the detected weight 402 before comparing the weight 402 with the expected weight 406. By removing the bag weight 412 from the weight 402, the weight 402 more closely represents the weight of the items in the bag 118 and may provide for more accurate theft detection. In embodiments where the weight of the bag 118 is unknown (e.g., because the bag 118 does not include an identifier 410), the item tracking server 112 may deduct a standard weight or a statistical average weight for a bag 118 (e.g., an eco-bag). Alternatively, the item tracking server 112 may increase the inequality threshold to accommodate larger deviations of the detected weight 402 from the expected weight 406. Stated differently, the item tracking server 112 may increase the inequality threshold to account for the detected weight 402 including the weight of the bag 118.

Figure 5:
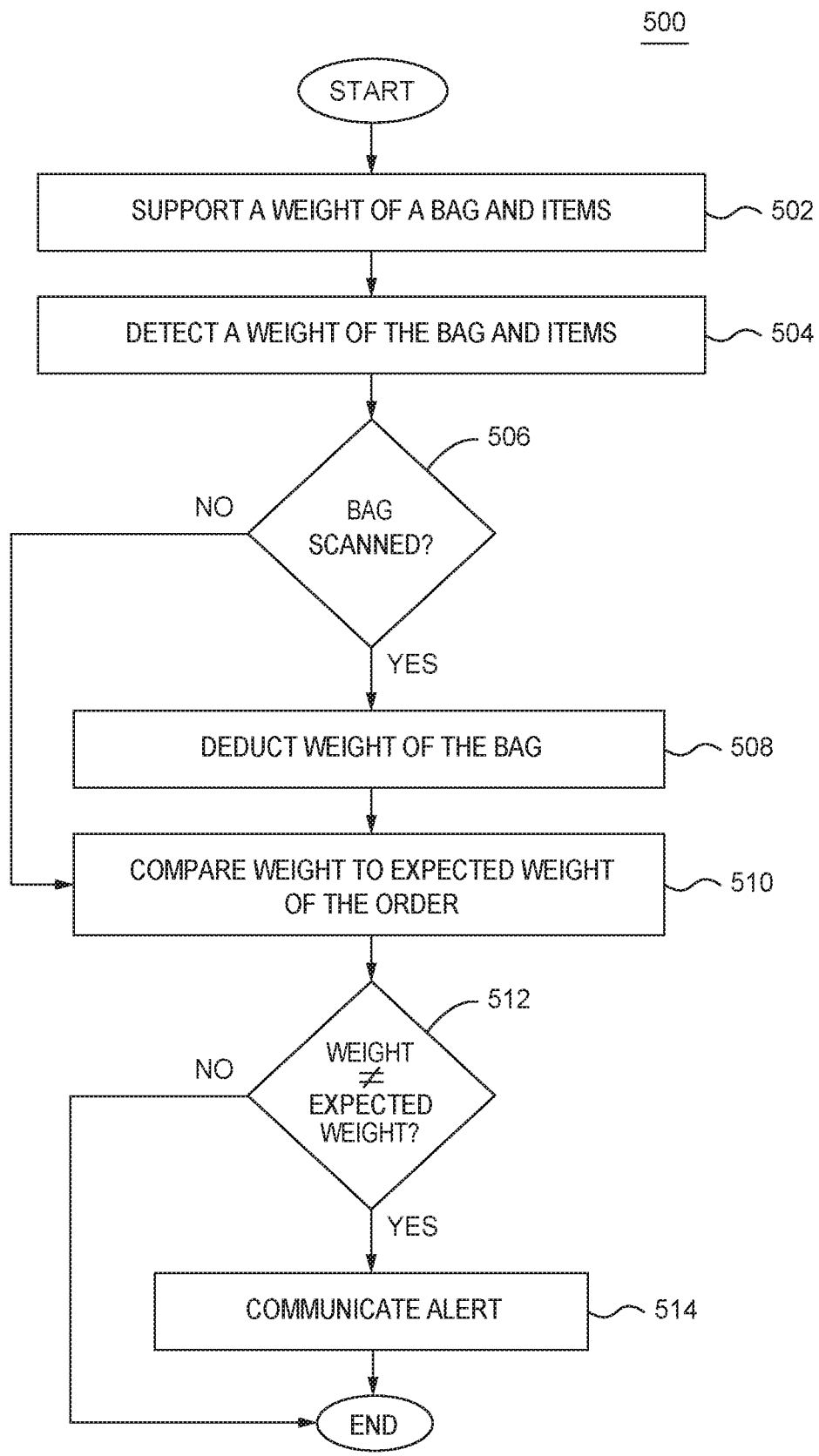
FIG. 5 is a flowchart showing a process for detecting theft using the system of FIG. 1.

FIG. 5 is a flowchart of a process 500 for detecting theft using the system 100 of FIG. 1. Generally, various components of the system 100 perform the steps of process 500. In particular embodiments, by performing process 500, the system 100 detects theft as the theft is occurring.

In step 502, a support 208 supports a weight of a bag 118 and items in the bag 118. The support 208 may be located at a checkout station 108 and/or an exit station 110. The support 208 may be a bar, a hook, or a platform. In step 504, a sensor 302 detects a weight of the bag 118 and the items in the bag 118. The sensor 302 may be coupled to an end of the support 208. When the support 208 is supporting the weight of the bag 118 and the items in the bag 118, a tension force may be created from the sensor 302 to the support 208. The sensor 302 may detect the tension and convert the detected tension to a weight. The sensor 302 may then communicate the detected weight to the item tracking server 112.

In step 506, the item tracking server 112 may determine whether an identifier 410 of the bag 118 was scanned. If the identifier 410 was not scanned (e.g., because the bag 118 did not have an identifier 410), the process 500 may proceed to step 510. In some embodiments, the item tracking server 112 deducts a standard weight or a statistical average weight of a bag 118 from the detected weight 402 when the identifier 410 is not scanned. Alternatively, the item tracking server 112 may increase the inequality threshold to accommodate larger deviations of the detected weight 402 from the expected weight 406. Stated differently, the item tracking server 112 may increase the inequality threshold to account for the detected weight 402 including the weight of the bag 118.

If the identifier 410 of the bag 118 was scanned, then the item tracking server 112 may retrieve the weight 412 of the bag from the database 113. The item tracking server 112 then deducts the weight 412 of the bag from the detected weight 402 in step 508. In step 510, the item tracking server 112 compares the weight 402 to the expected weight 406 of the order. The expected weight 406 may be determined based on the items scanned by the user 102. For example, as the items 404 are scanned by the user 102, the item tracking server 112 may retrieve the weight of the scanned item 404 from the database 113. The item tracking server 112 may keep a running total of the weight of the items 404. This running total may be the expected weight 406.

The item tracking server 112 then determines whether the weight 402 is unequal from the expected weight 406. For example, the item tracking server 112 may determine whether the weight 402 is unequal from the expected weight 406 past a threshold (e.g., the inequality threshold discussed above). In particular embodiments, the item tracking server 112 may not perform step 512 until the user 102 indicates that all items have been scanned. The user 102 may indicate that all items have been scanned by attempting to pay for the items in the bag 118. If the weight 402 is not unequal past the threshold from the expected weight 406, then process 500 may conclude. If the weight 402 is unequal past the threshold from the expected weight 406, then the item tracking server 112 communicates an alert 408 in step 514. In certain embodiments, a light 210 activates in response to the alert 408. A store employee who sees the activated light 210 may approach to assist the user 102.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method comprising:
   supporting, by a support, a handle of a bag containing one or more items of an order as the bag hangs by the handle on the support;
   detecting, by a sensor coupled to an end of the support such that the support extends laterally from the sensor and parallel to the ground, a weight of the bag and the one or more items when the bag is hanging by the handle on the support such that the weight of the bag and the one or more items is exerted on the support through the handle;
   comparing, by a hardware processor, the detected weight to an expected weight of the order; and
   communicating, by the hardware processor, an alert when the expected weight is unequal to the detected weight.

2. The method of claim 1, further comprising converting, by the sensor, a tension experienced by the sensor to the detected weight.

3. The method of claim 1, further comprising scanning, by a scanner, an identifier on the bag.

4. The method of claim 3, further comprising:
   determining, by the hardware processor, a weight of the bag based on the scanned identifier; and
   removing, by the hardware processor, the weight of the bag from the detected weight before comparing the detected weight to the expected weight.

5. The method of claim 1, further comprising activating a light in response to the alert being communicated.

6. The method of claim 1, further comprising determining, by the hardware processor, the expected weight as the one or more items are scanned.

7. The method of claim 1, wherein the detected weight exceeding the expected weight indicates that an item in the bag is unaccounted for.

8. A system comprising:
a support configured to support a handle of a bag containing one or more items of an order as the bag hangs by the handle on the support;
a sensor coupled to an end of the support such that the support extends laterally from the sensor and parallel to the ground, the sensor configured to detect a weight of the bag and the one or more items when the bag is hanging by the handle on the support such that the weight of the bag and the one or more items is exerted on the support through the handle;
a computer system communicatively coupled to the sensor, the computer system comprising a memory and a hardware processor configured to:
compare the detected weight to an expected weight of the order; and
communicate an alert when the expected weight is unequal to the detected weight.

9. The system of claim 8, wherein the sensor is a tension sensor configured to convert a tension experienced by the sensor to the detected weight.

10. The system of claim 8, further comprising a scanner configured to scan an identifier on the bag.

11. The system of claim 10, wherein the hardware processor is further configured to:
determine a weight of the bag based on the scanned identifier; and
remove the weight of the bag from the detected weight before comparing the detected weight to the expected weight.

12. The system of claim 8, further comprising a light configured to activate in response to the alert being communicated.

13. The system of claim 8, wherein the hardware processor is further configured to determine the expected weight as the one or more items are scanned.

14. The system of claim 8, wherein the detected weight exceeding the expected weight indicates that an item in the bag is unaccounted for.

15. A system comprising:
a support configured to support a handle of a bag containing one or more items of an order as the bag hangs by the handle on the support;
a sensor coupled to an end of the support such that the support extends laterally from the sensor and parallel to the ground, the sensor configured to detect a weight of the bag and the one or more items when the bag is hanging by the handle on the support such that the weight of the bag and the one or more items is exerted on the support through the handle;
a scanner configured to scan an identifier on the bag;
a computer system communicatively coupled to the sensor, the computer system comprising a memory and a hardware processor configured to:
determine a weight of the bag based on the scanned identifier;
remove the weight of the bag from the detected weight;
compare the detected weight to an expected weight of the order; and
communicate an alert when the expected weight is unequal to the detected weight.

16. The system of claim 15, wherein the sensor is a tension sensor configured to convert a tension experienced by the sensor to the detected weight.

17. The system of claim 15, wherein the weight of the bag is stored prior to detecting the weight of the bag and the one or more items.

18. The system of claim 17, wherein the hardware processor is further configured to retrieve the weight of the bag based on the scanned identifier.

19. The system of claim 15, further comprising a light configured to activate in response to the alert being communicated.

20. The system of claim 15, wherein the hardware processor is further configured to determine the expected weight as the one or more items are scanned.

* * * * *